UNITED STATES PATENT OFFICE.

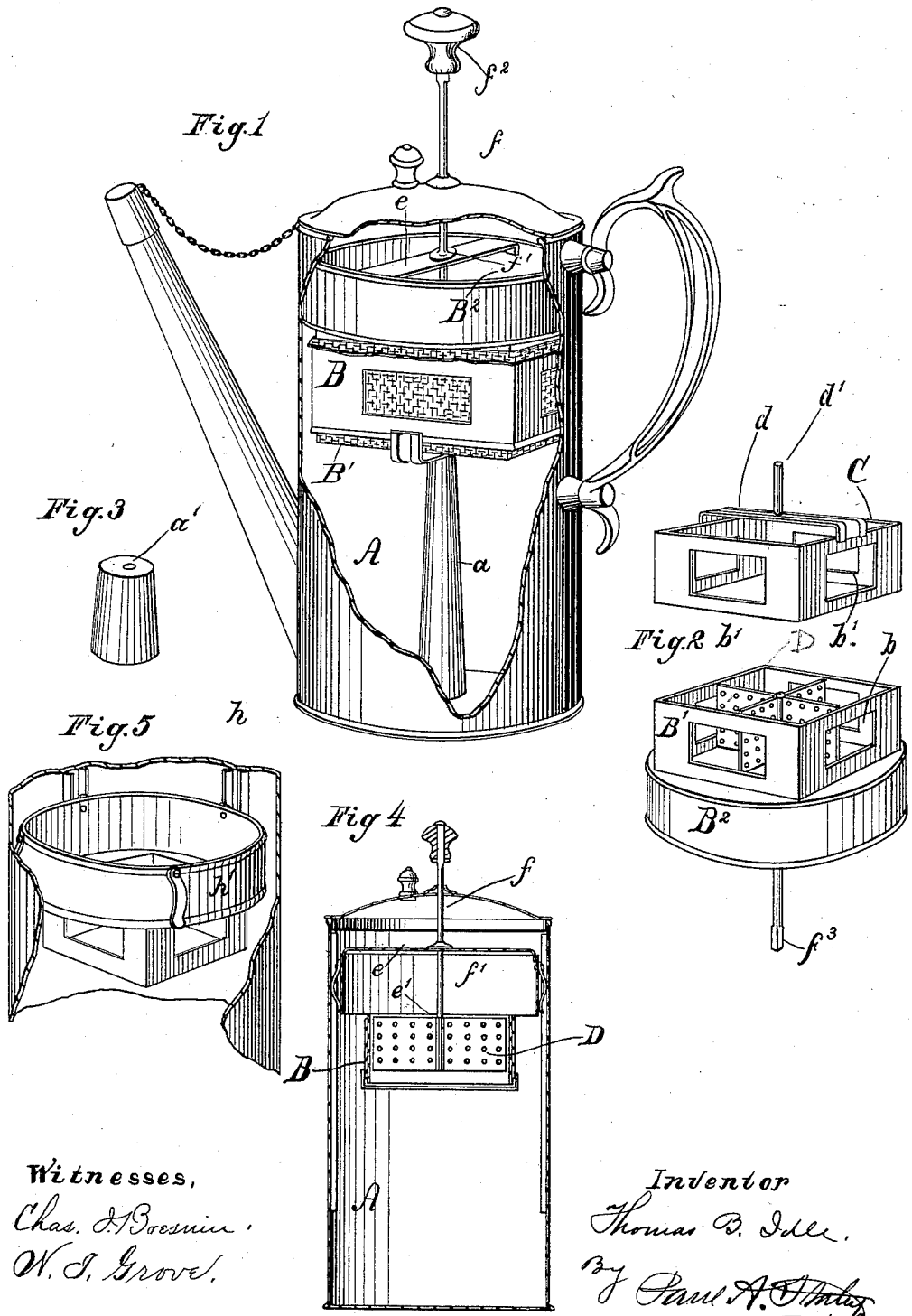

THOMAS B. IDLE, OF CRAYON, OHIO.

COFFEE-POT.

SPECIFICATION forming part of Letters Patent No. 391,617, dated October 23, 1888.

Application filed May 18, 1888. Serial No. 274,335. (No model.)

*To all whom it may concern:*

Be it known that I, THOMAS B. IDLE, a citizen of the United States, residing at Crayon, in the county of Champaign and State of Ohio, have invented certain new and useful Improvements in Coffee-Pots, of which the following is a specification.

My invention relates to improvements in coffee-pots; and it particularly relates to that class of coffee-pots in which a reservoir is provided to retain the coffee in such a manner that the water may be brought in contact therewith and at the same time retaining the ground coffee within the reservoir and preventing the same from coming into the coffee-pot proper.

My invention consists in the various constructions and combinations of parts, hereinafter described and claimed.

In the accompanying drawings, Figure 1 is a perspective view of a coffee-pot embodying my invention, the outer casing being broken away to illustrate the inner operating mechanism. Fig. 2 is a perspective view of the reservoir or strainer in an inverted position with the cloth-holding ring removed. Fig. 3 is a perspective view in detail of the upper end of the reservoir-support. Fig. 4 is a vertical sectional elevation view showing a modification in the construction of the pot and in the manner of holding the reservoir. Fig. 5 is a perspective view of the same in detail.

Like parts are indicated by similar letters of reference throughout the several views.

In the said drawings, A represents a coffee-pot of ordinary construction, preferably provided with straight sides and a tight-fitting cover in the ordinary manner. Located in the top of the coffee-pot, and preferably supported on a central standard, $a$, is the coffee receptacle or strainer B. This coffee-receptacle consists, essentially, of two parts, the coffee-chamber B' and water-chamber $B^2$. The upper or water chamber, $B^2$, is preferably of a size and shape to fit snugly within the outer casing of the pot A. The coffee-chamber B' is preferably square and provided on each side with openings $b$.

Fitting snugly over the outside of the coffee-chamber B' is a cloth-retaining sleeve or ring, C, provided in its side with openings $b'$, adapted, when in position on the outside of the chamber B', to coincide with the openings $b$ in said chamber. In preparing the coffee-chamber B' for use a strainer-cloth of sufficient size to cover the bottom and sides of the said chamber is placed thereon and the band or sleeve C forced over the same, thus stretching the cloth tightly on the bottom of said chamber and over the openings $b'$.

Extending across the bottom of the band C is a supporting-strip, $d$, provided with a projection, $d'$, adapted to fit in an opening, $a'$, in the top of the standard $a$. Extending across the water-chamber $B^2$, at the top and bottom thereof, are supporting-strips $e$ $e'$, in which is journaled a shaft, $f$, provided with a collar, $f'$, adapted to rest upon the upper strip, $e$, and extend into the coffee-chamber B', and provided with a winged or vaned stirring-wheel, D. This stirring-wheel D is preferably made with four wings, as shown in Fig. 2, each of which is little less than the depth of the coffee-receptacle, in which the said wheel is adapted to revolve. Each of the wings of the stirring-wheel D is provided with a number of small perforations to permit the water to pass through the same, and thus bring the water in contact with all parts of the coffee in the coffee-chamber. The shaft $f$ is extended up through the lid of the coffee-pot proper, and is provided with a removable knob or handle, $f^2$, the top of the shaft $f$ being made square, as shown at $f^3$ in Fig. 2, for this purpose.

In making coffee with my improved coffee-pot the chamber B' is filled with coffee ground very fine, and boiling water poured into the chamber $B^2$, the stirrer D is revolved by the handle $f^2$, through the shaft $f$, and thus the boiling water is brought in contact with every portion of the coffee and percolates through the same, passing through the strainer at the bottom and sides of the said receptacle into the coffee-pot proper. The coffee being thoroughly stirred as the water passes through the same, a strong decoction of coffee will pass through to the lower compartment or coffee-pot proper, leaving the worthless portion of the coffee in the receptacle above.

In Figs. 4 and 5 I have shown a modification of my invention, in which the standard $a$ is dispensed with. In this construction I provide in the sides of the coffee-pot small grooves $h$, adapted to receive supporting-springs $h'$ on the sides of the coffee-receptacle B. By this construction the receptacle B may be moved up or down, as desired, in the pot proper to accommodate it to the quantity of coffee to be made.

It is evident that other modifications of my invention may be employed without departing from the spirit thereof. I do not, therefore, limit myself to the exact construction shown.

Having thus described my invention, I claim—

1. In a coffee-pot, the upper receiving-receptacle having the coffee-chamber and water-chamber therein, a strainer in said coffee-chamber and a stirring-wheel in the same, and means, substantially as described, for revolving said stirring-wheel from the outside of said coffee-pot, substantially as set forth.

2. The combination, in a coffee-pot, of a coffee-receiving receptacle having the lower coffee-chamber and the upper water-chamber, the stirring-wheel in said coffee-chamber, a shaft connected to said stirring-wheel, adapted to extend upward through the lid of said coffee-pot, a strainer, and a strainer-securing band provided with openings adapted to coincide with similar openings provided in said chamber, and a supporting-strip across said band, substantially as set forth.

3. In a coffee-pot, the coffee-receiving receptacle having the lower coffee-chamber and upper water-chamber, supporting-strips across the top and bottom of said water-chamber, a shaft journaled in said supporting-strips and provided with a collar adapted to rest on one of said strips, a perforated stirring-wheel on said shaft in said coffee-chamber, a strainer under said coffee-chamber, and a strainer-holding band around said chamber, substantially as specified.

In testimony whereof I have hereunto set my hand this 3d day of May, A. D. 1888.

THOMAS B. IDLE.

Witnesses:
ROMANES COX,
S. J. BARGER.